United States Patent
Ho et al.

(10) Patent No.: US 10,318,681 B1
(45) Date of Patent: Jun. 11, 2019

(54) STATIC LEAKAGE CURRENT AND POWER ESTIMATION

(71) Applicant: Xilinx, Inc., San Jose, CA (US)

(72) Inventors: Fu-Hing Ho, Los Gatos, CA (US); Johnie Au, Cupertino, CA (US)

(73) Assignee: XILINX, INC., San Jose, CA (US)

( * ) Notice: Subject to any disclaimer, the term of this patent is extended or adjusted under 35 U.S.C. 154(b) by 51 days.

(21) Appl. No.: 15/635,461

(22) Filed: Jun. 28, 2017

(51) Int. Cl.
*G06F 17/50* (2006.01)

(52) U.S. Cl.
CPC ...... *G06F 17/5036* (2013.01); *G06F 17/5081* (2013.01); *G06F 2217/78* (2013.01)

(58) Field of Classification Search
CPC ............. G06F 17/5081; G06F 17/5036; G06F 2217/78
USPC ..................... 716/109, 111, 113, 136; 703/15
See application file for complete search history.

(56) References Cited

U.S. PATENT DOCUMENTS

| | | | | |
|---|---|---|---|---|
| 2002/0099989 A1* | 7/2002 | Kawabe | ............... | G06F 17/5045 714/724 |
| 2007/0085567 A1* | 4/2007 | Berthold | .......... | H03K 19/01728 326/86 |
| 2011/0026806 A1* | 2/2011 | Bernstein | ............. | G01R 31/311 382/145 |
| 2013/0107651 A1* | 5/2013 | Singh | ................... | G11C 11/412 365/207 |
| 2015/0070049 A1* | 3/2015 | Laurent | .............. | H03K 19/0016 326/93 |
| 2018/0367142 A1* | 12/2018 | Laurent | ............... | G06F 17/5045 |

OTHER PUBLICATIONS

Ansys, Inc., "ANSYS RedHawk: Power Integrity and Reliability Analysis," [online] [retrieved May 4, 2017], retrieved from the Internet: <http://www.ansys.com/products/semiconductors/ansys-redhawk>, 7 pgs.
Quarles, T. et al., "The Spice Home Page," [online] EECS Department of the University of California at Berkeley [retrieved May 4, 2017], retrieved from the Internet: <https://bwrcs.eecs.berkeley.edu/Classes/IcBook/SPICE/>, 2 pgs.
Synopsys, Inc., "PrimeTime PX: Signoff Power Analysis," [online][retrieved May 4, 2017], retrieved from the Internet: <https://www.synopsys.com/apps/support/training/primetimepx_fcd.html>, 5 pgs.

* cited by examiner

*Primary Examiner* — Phallaka Kik
(74) *Attorney, Agent, or Firm* — Kevin T. Cuenot (57) ABSTRACT

Leakage current estimation for a circuit can include generating a cell leakage library including cell-level leakage current geometry data for different states of cells of a cell library, wherein the cells are specified as transistor-level netlists, and determining, using a processor, gate-level leakage current geometry data for gates of a gate-level netlist for the circuit based upon states of the gates for a selected operating state of the circuit and the cell-level leakage current geometry data. Total leakage current geometry data can be determined, using the processor, for the gate-level netlist by aggregating the gate-level leakage current geometry data.

18 Claims, 2 Drawing Sheets

STATIC LEAKAGE CURRENT AND POWER ESTIMATION

FIELD OF THE INVENTION

This disclosure relates to power estimation and, more particularly, to estimating static leakage power for circuit designs and/or integrated circuits.

BACKGROUND

Each new generation of integrated circuit (IC) continues to provide greater processing performance than the generation before. Growth in processing performance is often limited by how much power the IC is capable of safely dissipating as opposed to the ability to scale up the size of the IC and/or the number of transistors in the IC. There are a variety of different types of power such as dynamic power and static power that must be accounted for and safely dissipated by the IC. Static power consists of design static power and device static power. Design static power is caused by design specific bias conditions. Device static power is caused by leakage currents within the IC and is responsible for a significant amount of the power that must be dissipated.

SUMMARY

One or more embodiments are directed to methods of leakage current estimation for a circuit. In one aspect, a method can include generating a cell leakage library including cell-level leakage current geometry data for different states of cells of a cell library, wherein the cells are specified as transistor-level netlists, and determining, using a processor, gate-level leakage current geometry data for gates of a gate-level netlist for the circuit based upon states of the gates for a selected operating state of the circuit and the cell-level leakage current geometry data. The method can include determining, using the processor, total leakage current geometry data for the gate-level netlist by aggregating the gate-level leakage current geometry data.

One or more embodiments are directed to systems for leakage current estimation for a circuit. In one aspect, a system includes a memory configured to store instructions and a processor coupled to the memory, wherein the processor, responsive to executing the instructions, is configured to initiate operations. The operations include generating a cell leakage library including cell-level leakage current geometry data for different states of cells of a cell library, wherein the cells are specified as transistor-level netlists, and determining gate-level leakage current geometry data for gates of a gate-level netlist for the circuit based upon states of the gates for a selected operating state of the circuit and the cell-level leakage current geometry data. The operations can include determining total leakage current geometry data for the gate-level netlist by aggregating the gate-level leakage current geometry data.

One or more embodiments are directed to computer program products for leakage current estimation for a circuit. In one aspect, a computer program product includes a computer readable storage medium having program code stored thereon. The program code is executable by a processor to perform operations including generating a cell leakage library including cell-level leakage current geometry data for different states of cells of a cell library, wherein the cells are specified as transistor-level netlists, and determining gate-level leakage current geometry data for gates of a gate-level netlist for the circuit based upon states of the gates for a selected operating state of the circuit and the cell-level leakage current geometry data. The operations can include determining, using the processor, total leakage current geometry data for the gate-level netlist by aggregating the gate-level leakage current geometry data.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION OF THE DRAWINGS

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to power estimation and, more particularly, to estimating static leakage power for circuit designs and/or integrated circuits. One or more embodiments described within this disclosure relate to estimating static leakage power dissipated by a circuit design and/or an IC using a gate-level approach. In an aspect, cell-level leakage current geometry data is generated. The cell-level leakage current geometry data is used to generate gate-level leakage current geometry data for a gate-level netlist. The gate-level leakage current geometry data facilitates accurate and efficient static leakage power estimation for the gate-level netlist. The leakage current geometry data that is generated is independent of process, voltage, and temperature (PVT) corners. As a result, the gate-level leakage current geometry data may be used to estimate static leakage power for the gate-level netlist across a plurality of different PVT corners.

In one or more embodiments, the gate-level leakage current geometry data are used to calculate total leakage current geometry data for the circuit design and/or IC as a whole. The total leakage current geometry data, in combination with normalized current(s), may be used to determine static leakage currents for the circuit design and/or IC. To determine static leakage current for different PVT corners, the same total leakage current geometry data may be used with different normalized current(s) corresponding to different PVT corners.

Because the static leakage current calculations are performed at the gate-level, the resulting calculations are significantly faster than other techniques for estimating and/or determining static leakage power such as SPICE. Static leakage power estimation as described herein can be performed using efficient data look-up operations and summation that reduces the number of multiplication operations to be performed compared to other techniques for static leakage power estimation.

As an illustrative and non-limiting example, a SPICE run performed by a computing system to estimate static leakage power for a circuit design that includes approximately one million gates may require several days to complete. A run performed by the same computing system using the gate-level approach described within this disclosure to estimate static leakage power for the same circuit design or IC may complete execution in approximately 10 minutes. In addition, the example embodiments described herein provide accuracy on par with conventional cell-based, transistor-level leakage estimation techniques. Thus, the embodiments described herein provide improved operation of a computer system. Further, the embodiments described herein provide improved operation of computer-aided design (CAD) and/or electronic design automation (EDA) tools.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
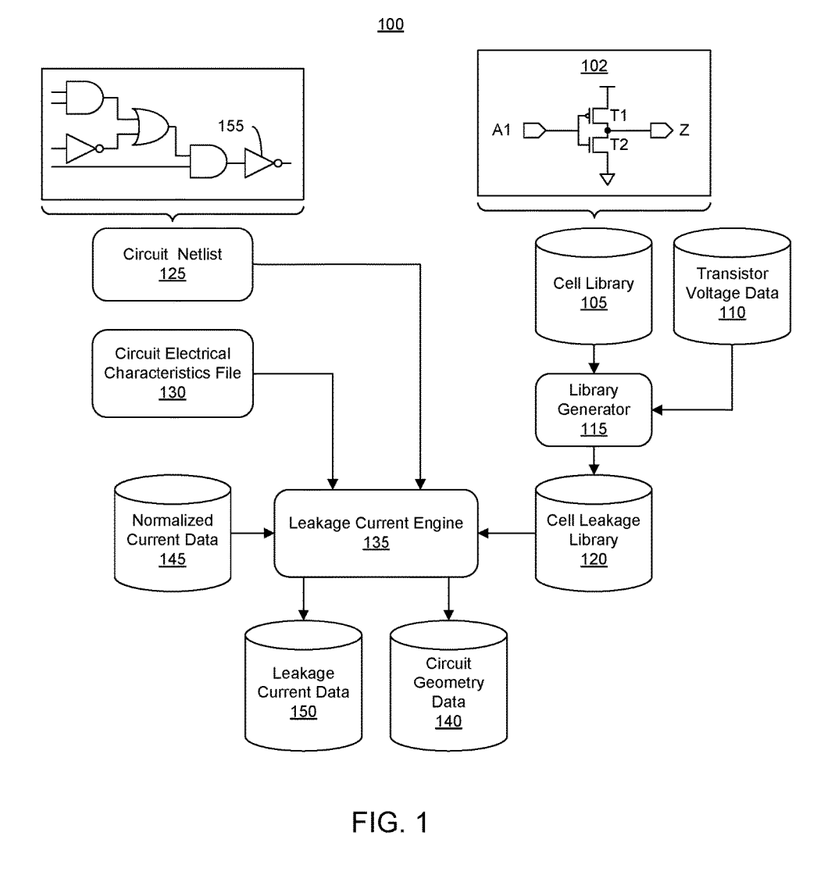
FIG. 1 illustrates an example software architecture for estimating static leakage power.

FIG. 1 illustrates an example software architecture 100 for estimating static leakage power. Software architecture 100 illustrates example instructions and data structures that may be stored in memory and executed by a data processing system such as a computer or other system having a processor and memory. An example hardware architecture for a data processing system suitable for executing software architecture 100 is described in greater detail in connection with FIG. 3.

Cell library 105 includes a plurality of cells. In one aspect, cell library 105 is a standard cell library. Cell library 105, for example, specifies full implementations for the cells included therein. In an embodiment, each cell of cell library 105 is specified as a transistor-level netlist.

A cell is a group of transistor and interconnect structures that provides an electronic circuit function. In an embodiment, the function is a Boolean logic function (e.g., AND, OR, XOR, XNOR, inverters, etc.) or a storage function (e.g., flip-flop, register, latch, etc.). Cells are direct transistor-level representations of circuits that perform these functions. Other examples of cells are transistor-level representations circuits that implement NAND, NOR, and XOR Boolean functions.

As an illustrative and non-limiting example, a cell may specify leakage current geometry data for each transistor in that cell for a specific logic state of the cell. As used herein, leakage current geometry data is one or more physical dimensions of a portion or element of one or more transistors. As such, leakage current geometry data may be expressed as a width, a length, or an area. For example, leakage current geometry data is expressed in microns (micrometers) and/or in square microns.

In one or more embodiments, the leakage current geometry data for a transistor in cell library 105 may specify one or more different widths, lengths, and/or areas where each different item of leakage current geometry data corresponds to a different type of leakage current for a specific logic state. Examples of different types of leakage currents for transistors that can be represented as items of leakage current geometry data include, but are not limited to, channel leakage, tunneling leakage, and bulk leakage.

Transistor voltage data 110 is a database or a file (or files) that specifies voltages for the various nodes of the standard cells for all possible logic states of the cells. Transistor voltage data 110 specifies voltages for nodes of the cells of cell library 105 for the different operating states achievable by each of the cells. Transistor voltage data 110 indicates which transistors of the cells are on and which are off for the different states specified therein. In one example, transistor voltage data 110 is an initial conditions file obtained from a circuit simulation from SPICE. The examples provided herein, however, are not intended to be limiting. For example, transistor voltage date 110 may be specified in any of a variety of other suitable formats.

In one aspect, library generator 115 is capable of operating on cell library 105 using transistor voltage data 110 to generate cell leakage library 120. In an aspect, library generator 115 is implemented as executable instructions stored in memory. For example, library generator 115 may be implemented as one or more binary files, scripts, and/or other suitable program code. Library generator 115 is capable of parsing cell library 105 to generate the cell-level static leakage current geometry data stored as cell leakage library 120. For each cell, library generator 115 is capable of determining the static leakage current geometry data for each different operating state of the cell.

As an illustrative and non-limiting example, library generator 115 is capable obtaining a cell from standard cell library 105. Library generator 115 is capable of determining the operating states of the cell from transistor voltage data 110 and, as such, which transistors of the cell are on and which are off in each operating state. For a selected operating state of a cell, library generator 115 is capable of summing the static leakage current geometry data for the transistors of the cell that are off. Library generator 115 is capable of repeating this process across each operating state of the cell. Library generator 115 is further capable of performing the process across the other cells of cell library 105 to generate cell leakage library 120.

Cell 102 is an example of a cell within cell library 105. Library generator 115 is capable of identifying or selecting cell 102 from standard cell library 105. In this example, cell 102 is a complementary metal-oxide-semiconductor (CMOS) inverter (inverter). The inverter includes a p-type transistor (T1) and an n-type transistor (T2). Cell 102 has a known state diagram that may be determined from transistor voltage data 110. In a first state, when input A1 is high, output Z is low. In the first state, T1 is off and T2 is on. As such, T1 (the p-type transistor) is responsible for the leakage current while T2 (the n-type transistor) is on and driving short circuit current when Z switches from high to low. In a second state, when input A1 is low, output Z is high. In the second state, T1 is on and T2 is off. As such, T2 is responsible for the leakage current while T1 is on and driving short circuit current when Z switches from low to high.

In one or more embodiments, the cell-level static leakage current geometry data stored in cell leakage library 120 includes a plurality of different types of static leakage current geometry data. For example, the different types of static leakage current geometry data can include, but are not limited to, a leaking width (e.g., a width measured in um), a leaking gate area (e.g., measured in um$^2$), and a bulk leaking width (e.g., measured in um). Leaking width correlates with the channel leakage or source to drain leakage for the transistor. The leaking gate area correlates to tunnelling leakage. Tunnelling leakage current is the leakage current from the gate to the bulk or drain of the transistor. The bulk leaking width correlates to bulk leakage, which is the leakage current from the source or drain into the substrate of the IC.

Whereas cell library 105 specifies full implementations for the cells included therein, cell leakage library 120 includes cell-level static leakage current geometry data. The cell-level static leakage current geometry data specifies the different items of static leakage current geometry data aggregated for each cell. For example, rather than specifying a leaking width, a leaking gate area, and a bulk leaking width for each transistor of the cell, the cell-level static leakage current geometry data specifies a single aggregated (e.g., summed) leaking width for the cell, a single aggregated leaking gate area for the cell, and a single aggregated bulk leaking width for the cell for each of the different operating states of the cell. Cell leakage library 120 is PVT independent.

In the case of cell 102, for example, library generator 115 creates cell-level leakage current geometry data for the first state and the second state (e.g., each state of cell 102). Library generator 115 is capable of creating a first entry for the first state of cell 102 and a second entry for the second state of cell 102. The first entry corresponding to the first state includes cell-level leakage current geometry data for T1 (e.g., leaking width, leaking gate area, and bulk leaking width). The second entry corresponding to the second state includes cell-level leakage current geometry data for T2 (e.g., leaking width, leaking gate area, and bulk leaking width). If, for example, a cell has two or more transistors off in a given operating state, the cell-level leakage current geometry data would include a sum of the leaking width, a sum of the leaking gate area, and a sum of the bulk leaking widths of each transistor of the cell that is off in that operating state.

The inverter example corresponding to cell 102 does not have states in which two different types of transistors (p-type and n-type) are off at the same time. For those cells that are more complex and have both p-type and n-type transistors off at the same time for one or more different states, the leaking width, leaking gate area, and bulk leaking width may be specified independently for the p-type transistors (e.g., as a first set of summed geometry data items) and for the n-type transistors (e.g., a second set of summed geometry data items).

In the example of FIG. 1, a circuit netlist 125 and a circuit electrical characteristics file (circuit file) 130 are provided to leakage current engine 135. Circuit netlist 125 is a description of the connectivity of elements of an electronic circuit. Circuit netlist 125 may be specified as a data structure using a hardware description language. The electronic circuit may be for an entire device such as an IC. The IC may be a programmable IC. For example, the programmable IC may be a field programmable gate array (FPGA).

In an embodiment, circuit netlist 125 is a gate-level netlist. A gate-level netlist specifies circuitry in terms of higher level gates. Examples of gates specified in circuit netlist 125 include logic gates including, but are not limited to, AND gates, OR gates, NOR gates, and NAND gates. In one or more embodiments, there is a one-to-one correspondence between gates and cells. A gate-level netlist, however, does not specify transistor level information.

Circuit file 130 specifies voltage values for nodes of circuit netlist 125 at a particular or selected operating state of circuit netlist 125. In one example, circuit file 130 is a VCD file. In another example, circuit file 130 is an FSDB file. In another example, circuit file 130 specifies values such as 0 and 1 for the nodes (e.g., inputs and outputs) of gates of circuit netlist 125. The example file formats described herein are not intended to be limiting of the inventive arrangements described within this disclosure. In an embodiment, circuit file 130 is generated from performing a simulation of circuit netlist 125. For example, circuit file 130 may be generated from performing an HDL (e.g., Verilog and/or VHDL) simulation of circuit netlist 125 to determine the state of the boundaries (e.g., inputs and outputs) of the gates of circuit netlist 125.

Accordingly, in an aspect, circuit file 130 specifies the states of the inputs and outputs of the gates of circuit netlist 125 for the selected operating state. In an embodiment, circuit file 130 is generated from a simulation of circuit netlist 125 at a static operating state. For example, in the case where circuit netlist 125 represents gates of a programmable IC or represents an entire programmable IC, circuit file 130 may be generated for a point in time where the circuitry represented by circuit netlist 125 has completed a startup process and is initialized. In the case where circuit netlist 125 represents an FGPA or portions of an FPGA, for example, the static operating state represented in circuit file 130 is where the FPGA has been initialized but has not yet been loaded with a configuration bitstream or other user circuit design. The FPGA, for example, is in a powered-on, initialized, and un-configured state.

In an aspect, leakage current engine 135 is implemented as executable instructions stored in memory. For example, leakage current engine 135 may be implemented as one or more binary files, scripts, and/or other suitable program code. For a given PVT corner, leakage current engine 135 is capable of determining leakage current data 150 for circuit netlist 125. In determining leakage current data 150, leakage current engine 135 is capable of generating circuit geometry data 140. Leakage current engine 135 uses circuit geometry data 140 and normalized current data 145 to determine leakage current data 150.

Leakage current engine 135 is capable of determining an operating state for the gates of circuit netlist 125 using circuit file 130. For each gate, given the operating state of the gate from circuit file 130, leakage current engine 135 is capable of looking up the cell-level leakage current geometry data for the gate from cell leakage library 120. Determining the leakage current geometry data for a gate may include one or more different lookup operations to cell leakage library 120. As an illustrative example, leakage current engine 135 is capable of looking up the cell-level leakage current geometry data from cell leakage library 120 for inverter 155 of circuit netlist 125 for the operating state of inverter 155 as determined from circuit file 130. Leakage current engine 135 looks up the entry for an inverter cell having a state that corresponds to, or matches, the state of inverter 155 from circuit file 130 and obtains the leakage current geometry data for the given state of the inverter. The retrieved data from cell leakage library 120, which is state specific for netlist 125, is referred to as gate-level leakage current geometry data. Leakage current engine 135 is capable of performing such operations for each of the other gates of circuit netlist 125. Using the gate-level leakage current geometry data, leakage current engine 135 calculates circuit geometry data 140.

In one or more embodiments, circuit geometry data 140 includes total leakage current geometry data for circuit netlist 125. Leakage current engine 135, for example, is capable of calculating a total leaking width for circuit netlist 125, a total leaking gate area for circuit netlist 125, and a total bulk leaking width for circuit netlist 125.

In one or more embodiments, the total leaking width is the summed leaking width for all gates of circuit netlist 125 in the selected operating state. The total leaking gate area is the summed leaking gate area for all gates of circuit design 125 in the selected operating state. The total bulk leaking width is the summed bulk leaking width for all gates of circuit netlist 125 in the selected operating state. These data are stored as circuit geometry data 140.

In one or more embodiments, circuit geometry data 140, as described herein, may include a total leaking width of n-type devices of circuit netlist 125, a total leaking gate area for n-type devices of circuit netlist 125, a total bulk leaking width for n-type devices of circuit netlist 125, a total leaking width of p-type devices of circuit netlist 125, a total leaking gate area for p-type devices of circuit netlist 125, and a total bulk leaking width for p-type devices of circuit netlist 125 for the selected operating state.

In one or more embodiments, leakage current engine 135 is capable of accessing normalized current data 145 and using normalized current data 145 in combination with circuit geometry data 140 to calculate leakage current data 150 for circuit netlist 125. Normalized current data specifies a leakage current on a per unit basis. For example, normalized currents are specified as current per micron or as current per square micron. Normalized currents of normalized current data 145 are specified on a per unit length, a per unit width, or per unit area basis. For example, a normalized current to be used with an item of leakage current geometry data expressed as a width is expressed on a per unit width basis. A normalized current to be used with an item of leakage current geometry data expressed as a length is expressed on a per unit length basis. A normalized current to be used with an item of leakage current geometry data expressed as an area is expressed on a per unit area basis. Thus, a normalized current may be stored within normalized current data 145 for each of the leaking width, leaking gate area, and bulk leaking width items of leaking current geometry data. In one or more embodiments, normalized current data 145 may specify a normalized current for n-type leaking width, p-type leaking width, n-type leaking gate area, p-type leaking gate area, n-type bulk leaking width, and p-type bulk leaking width.

In an embodiment, the normalized currents are determined from foundry data and/or models. Further, the normalized currents may be specified for a variety of different PVT corners. As such, to determine the leakage current for circuit netlist 125 for a particular PVT corner or one or more different PVT corners, leakage current engine 135 selects the normalized currents for the desired PVT corner(s) to calculate leakage current data.

In one or more embodiments, leakage current engine 135 is capable of determining leakage current data 150 for circuit netlist 125 by multiplying total leaking width, total leaking gate area, and total bulk leaking width for circuit design 125 by the respective normalized current for leaking width, leaking gate area, and bulk leaking width. Using the determined leakage currents, and EDA tool is capable of calculating the static leakage power of circuit netlist 125.

In one or more embodiments, leakage current engine 135 is capable of multiplying total n-type leaking width, total n-type leaking gate area, and total n-type bulk leaking width for circuit design 125 by the respective normalized current for n-type leaking width, n-type leaking gate area, and n-type bulk leaking width. Further, leakage current engine 135 is capable of multiplying total p-type leaking width, total p-type leaking gate area, and total p-type bulk leaking width for circuit design 125 by the respective normalized current for p-type leaking width, p-type leaking gate area, and p-type bulk leaking width. Using the determined leakage currents, and EDA tool is capable of calculating the static leakage power of circuit netlist 125.

Figure 2:
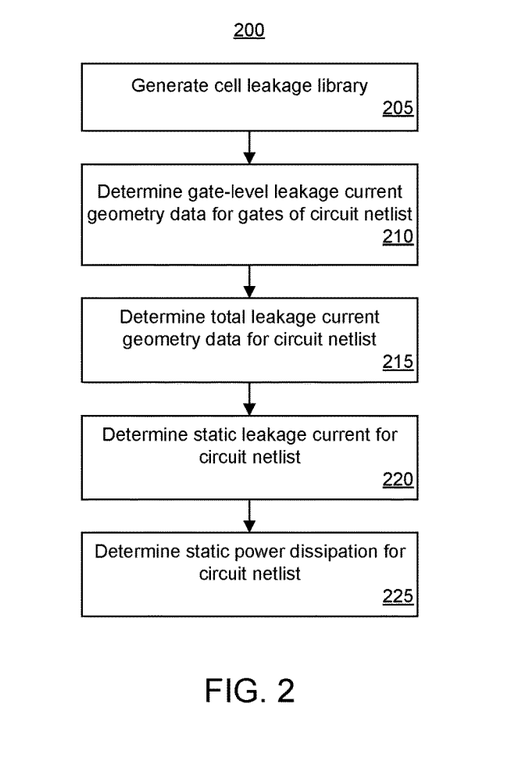
FIG. 2 illustrates an example method of static leakage power estimation for a circuit.

FIG. 2 illustrates an example method 200 of static leakage power estimation for a circuit. The circuit is represented by a circuit netlist. Method 200 is performed by a system such as a data processing system executing the software architecture described in connection with FIG. 1.

In block 205, the system generates a cell leakage library. The cell leakage library includes cell-level leakage current geometry data for a standard cell library. In an embodiment, the cell-level leakage current geometry data includes a width corresponding to channel leakage, an area corresponding to tunneling leakage, and a width corresponding to bulk leakage for each cell of the standard cell library as opposed to specifying such information on a per-transistor basis. Further, the system is capable of determining the cell-level leakage current geometry data for the cells for each of a plurality of different operating states of the cells.

In one or more embodiments, the cell leakage library may specify the cell-level leakage current geometry data for p-type and for n-type devices separately. For example, the system is capable of generating a cell leakage library that includes a width corresponding to channel leakage for n-type devices for each cell, an area corresponding to tunneling leakage for n-type devices for each cell, a width corresponding to bulk leakage for n-type devices for each cell, a width corresponding to channel leakage for p-type devices for each cell, an area corresponding to tunneling leakage for p-type devices for each cell, and a width corresponding to bulk leakage for p-type devices for each cell. Further, the system is capable of determining the cell-level leakage current geometry data for the cells for each of a plurality of operating states of the cells.

In block 210, the system determines gate-level leakage current geometry data for gates of the circuit netlist. The circuit netlist is implemented as a gate-level netlist. The gate-level leakage current geometry data is state-specific, e.g., specified to a particular operating state of the circuit netlist.

In an embodiment, the system determines the operating state of each individual gate in the gate-level netlist for a selected operating state of the gate-level netlist. The system looks up the cell-level leakage current geometry data for each gate. In looking up the cell-level leakage current geometry data for a gate, the system is capable of selecting the entry from the cell leakage library for the cell corresponding to the gate that has an operating state (cell-level operating state) matching or corresponding to the operating state of the gate being processed.

In block 215, the system determines the total leakage current geometry data for the circuit netlist. In an embodiment, the system aggregates the gate-level leakage current geometry data determined in block 210.

In one or more embodiments, the system sums the gate-level widths corresponding to channel leakage to generate a total width corresponding to channel leakage for the circuit netlist, sums the gate-level areas corresponding to tunneling leakage to generate a total area corresponding to tunneling leakage for the circuit netlist, and sums the gate-level widths corresponding to bulk leakage to generate a total width corresponding to bulk leakage for the circuit netlist.

In one or more embodiments, the system is capable of performing the summation described for n-type devices and for p-type devices. As an illustrative and non-limiting example, the system sums the gate-level widths corresponding to n-type channel leakage to generate a total width corresponding to n-type channel leakage for the circuit netlist, sums the gate-level areas corresponding to n-type tunneling leakage to generate a total area corresponding to n-type tunneling leakage for the circuit netlist, and sums the gate-level widths corresponding to n-type bulk leakage to generate a total width corresponding to n-type bulk leakage for the circuit netlist. The system further is capable of summing the gate-level widths corresponding to p-type channel leakage to generate a total width corresponding to p-type channel leakage for the circuit netlist, sums the gate-level areas corresponding to p-type tunneling leakage to generate a total area corresponding to p-type tunneling leakage for the circuit netlist, and sums the gate-level widths corresponding to p-type bulk leakage to generate a total width corresponding to p-type bulk leakage for the circuit netlist.

In block 220, the system is capable of determining static leakage current for the circuit netlist. The system, for example, multiplies the total leakage current geometry data for the circuit netlist by normalized current(s) to generate static leakage current for the circuit netlist. In one or more embodiments, the system multiplies the total width corresponding to channel leakage for the circuit netlist by a normalized current for channel leakage, multiplies the total area corresponding to tunneling leakage for the circuit netlist by a normalized current for tunneling leakage, and multiplies the total width corresponding to bulk leakage for the circuit netlist by a normalized current for bulk leakage. The system can sum the results of the multiplication to generate the static leakage current for the circuit netlist.

In one or more embodiments, the system multiplies the total width corresponding to n-type channel leakage for the circuit netlist by a normalized current for n-type channel leakage, multiplies the total area corresponding to n-type tunneling leakage for the circuit netlist by a normalized current for n-type tunneling leakage, and multiplies the total width corresponding to n-type bulk leakage for the circuit netlist by a normalized current for n-type bulk leakage. The system further is capable of multiplying the total width corresponding to p-type channel leakage for the circuit netlist by a normalized current for p-type channel leakage, multiplying the total area corresponding to p-type tunneling leakage for the circuit netlist by a normalized current for p-type tunneling leakage, and multiplying the total width corresponding to p-type bulk leakage for the circuit netlist by a normalized current for p-type bulk leakage. The system can sum the results of the multiplication to generate the static leakage current for the circuit netlist.

In block 225, the system is capable of determining static power dissipation for the circuit netlist using the leakage current for the circuit netlist determined in block 220. It should be appreciated that to determine the static power dissipation for the circuit netlist for a different PVT corner, the system need only perform blocks 220 and 225 using different normalized currents for a different PVT corner.

The example embodiments described herein are capable of determining static power dissipation for a circuit netlist in less time than other methods due, at least in part, to the gate-level handling described herein. By utilizing PVT independent width, length, and/or area measures to determine the circuit netlist-level leakage current geometry data on a gate-level basis, the system performs more efficient lookup operations and addition operations thereby reducing the number of more complex and time consuming multiplication operations to calculate leakage currents and/or static power dissipation. Accordingly, the system is able to calculate leakage currents and/or static power dissipation in less time than other conventional techniques while maintaining accuracy.

Figure 3:
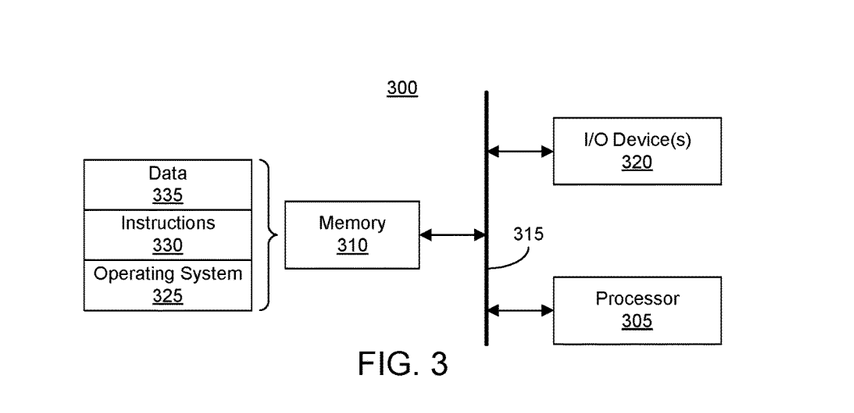
FIG. 3 illustrates an example architecture for a data processing system.

FIG. 3 illustrates an example architecture 300 for a data processing system for use with the embodiments described herein in connection with FIGS. 1-2. Architecture 300 includes at least one processor 305, e.g., a central processing unit (CPU). Processor 305 is coupled to memory 310 through interface circuitry 315. Architecture 300 stores computer readable instructions (also referred to as "program code") within memory 310. Memory 310 may be considered an example of computer readable storage media. Processor 305 executes the program code accessed from memory 310 via interface circuitry 315. In an aspect, architecture 300 is implemented as a computer or other system or device that is suitable for storing and/or executing program code.

Memory 310 includes one or more physical memory devices such as, for example, a local memory and one or more bulk storage devices. The term "local memory" refers to random access memory (RAM) or other non-persistent memory device(s) generally used during actual execution of the program code. The term "bulk storage device" refers to persistent data storage devices such as a hard disk drive (HDD), solid state drive (SSD), etc. Architecture 300 may also include one or more cache memories (not shown) that provide temporary storage of at least some program code to reduce the number of times program code must be retrieved from a bulk storage device during execution.

Examples of interface circuitry 315 include, but are not limited to, an input/output (I/O) subsystem, an I/O interface, a bus system, and a memory interface. For example, interface circuitry 315 may be one or more of any of several types of bus structures, including a memory bus or memory controller, a peripheral bus, an accelerated graphics port, and a processor or local bus using any of a variety of bus architectures. By way of example, and not limitation, such bus architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Architecture 300 further may include one or more input/output (I/O) devices 320 coupled to interface circuitry 315. I/O devices 320 may be coupled to architecture 300, e.g., through interface circuitry 315, either directly or through intervening I/O controllers. Examples of I/O devices 320 include, but are not limited to, a keyboard, a display device, a pointing device, one or more communication ports, a network adapter, etc. A network adapter refers to circuitry that enables architecture 300 to become coupled to other systems, computer systems, remote printers, and/or remote storage devices through intervening private or public networks. Modems, cable modems, Ethernet cards, and wireless transceivers are examples of different types of network adapters that may be used with architecture 300.

Memory 310 is configured to store one or more program modules. The program modules may generally include routines, programs, objects, components, logic, data structures, and so on. For purposes of illustration, memory 310 stores an operating system 325, instructions (e.g., program code, applications, scripts, etc.) 330, and data 335.

In one or more embodiments, instructions 330 and data 335 represent the software architecture described herein in connection with FIG. 1 and the operations described herein in connection with FIG. 2. Further, instructions 330 may represent or include an EDA application capable of performing the operations described herein. In another aspect, instructions 330 are capable of causing processor 305 to perform a design flow (e.g., synthesis, placement, routing, bitstream generation) on a circuit design to implement the circuit design within an IC.

In an aspect, operating system 325 and instructions 330, being implemented in the form of executable program code, are executed by architecture 300 and, more particularly, by processor 305, to perform the operations described within this disclosure. As such, operating system 325 and instructions 330 may be considered an integrated part of architecture 300. Further, it should be appreciated that any data used, generated, and/or operated upon by architecture 300 (e.g., processor 305) are functional data structures that impart functionality when employed as part of the system.

Architecture 300 may include fewer components than shown or additional components not illustrated in FIG. 3 depending upon the particular type of device and/or system that is implemented. In addition, the particular operating system and/or application(s) included may vary according to device and/or system type as may the types of I/O devices included. Further, one or more of the illustrative components may be incorporated into, or otherwise form a portion of, another component. For example, a processor may include at least some memory.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise. As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

As defined herein, the term "output" means storing in physical memory elements, e.g., devices, writing to display or other peripheral output device, sending or transmitting to another system, exporting, or the like. As defined herein, the term "plurality" means two or more than two.

As defined herein, the terms "one embodiment," "an embodiment," "one or more embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," and similar language throughout this disclosure may, but do not necessarily, all refer to the same embodiment.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, a graphics processing unit (GPU), a controller, and so forth.

As defined herein, the term "user" means a human being. The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

One or more embodiments are directed to methods of leakage current estimation for a circuit. In one aspect, a method can include generating a cell leakage library including cell-level leakage current geometry data for different states of cells of a cell library, wherein the cells are specified as transistor-level netlists, and determining, using a processor, gate-level leakage current geometry data for gates of a gate-level netlist for the circuit based upon states of the gates for a selected operating state of the circuit and the cell-level leakage current geometry data. The method can include determining, using the processor, total leakage current geometry data for the gate-level netlist by aggregating the gate-level leakage current geometry data.

In an aspect, the method can include calculating static leakage current for the gate-level netlist using the total leakage current geometry data and normalized current.

In another aspect, the normalized current is for a selected process corner, voltage, and temperature.

In another aspect, the total leakage current geometry data is independent of process corner, voltage, and temperature.

In another aspect, the determining the gate-level leakage current geometry data comprises looking up leakage current geometry data from the cell leakage library for the gates of the gate-level netlist based upon the state of each gate in the gate-level netlist.

In another aspect, the determining the total leakage current geometry data includes summing the gate-level leakage current geometry data for the gates of the gate-level netlist.

In another aspect, the total leakage current geometry data specifies a plurality of different types of leakage current geometry data.

In another aspect, the different types of leakage current geometry data include at least one of a width corresponding to channel leakage, an area corresponding to tunneling leakage, or a width corresponding to bulk leakage.

In another aspect, the method can also include calculating static leakage current for the gate-level netlist using a normalized current for each of the different types of leakage current geometry data.

One or more embodiments are directed to systems for leakage current estimation for a circuit. In one aspect, a system includes a memory configured to store instructions and a processor coupled to the memory, wherein the processor, responsive to executing the instructions, is configured to initiate operations. The operations include generating a cell leakage library including cell-level leakage current geometry data for different states of cells of a cell library, wherein the cells are specified as transistor-level netlists, and determining gate-level leakage current geometry data for gates of a gate-level netlist for the circuit based upon states of the gates for a selected operating state of the circuit and the cell-level leakage current geometry data. The operations can include determining total leakage current geometry data for the gate-level netlist by aggregating the gate-level leakage current geometry data.

In an aspect, the operations can include calculating static leakage current for the gate-level netlist using the total leakage current geometry data and normalized current.

In another aspect, the normalized current is for a selected process corner, voltage, and temperature.

In another aspect, the total leakage current geometry data is independent of process corner, voltage, and temperature.

In another aspect, the determining the gate-level leakage current geometry data comprises looking up leakage current geometry data from the cell leakage library for the gates of the gate-level netlist based upon the state of each gate in the gate-level netlist.

In another aspect, the determining the total leakage current geometry data includes summing the gate-level leakage current geometry data for the gates of the gate-level netlist.

In another aspect, the total leakage current geometry data specifies a plurality of different types of leakage current geometry data.

In another aspect, the different types of leakage current geometry data include at least one of a width corresponding to channel leakage, an area corresponding to tunneling leakage, or a width corresponding to bulk leakage.

In another aspect, the operations can also include calculating static leakage current for the gate-level netlist using a normalized current for each of the different types of leakage current geometry data.

One or more embodiments are directed to computer program products for leakage current estimation for a circuit. In one aspect, a computer program product includes a computer readable storage medium having program code stored thereon.

The program code is executable by a processor to perform operations including generating a cell leakage library including cell-level leakage current geometry data for different states of cells of a cell library, wherein the cells are specified as transistor-level netlists, and determining gate-level leakage current geometry data for gates of a gate-level netlist for the circuit based upon states of the gates for a selected operating state of the circuit and the cell-level leakage current geometry data. The operations can include determining, using the processor, total leakage current geometry data for the gate-level netlist by aggregating the gate-level leakage current geometry data.

In an aspect, the operations can include calculating static leakage current for the gate-level netlist using the total leakage current geometry data and normalized current.

In another aspect, the normalized current is for a selected process corner, voltage, and temperature.

In another aspect, the total leakage current geometry data is independent of process corner, voltage, and temperature.

In another aspect, the determining the gate-level leakage current geometry data comprises looking up leakage current geometry data from the cell leakage library for the gates of the gate-level netlist based upon the state of each gate in the gate-level netlist.

In another aspect, the determining the total leakage current geometry data includes summing the gate-level leakage current geometry data for the gates of the gate-level netlist.

In another aspect, the total leakage current geometry data specifies a plurality of different types of leakage current geometry data.

In another aspect, the different types of leakage current geometry data include at least one of a width corresponding to channel leakage, an area corresponding to tunneling leakage, or a width corresponding to bulk leakage.

In another aspect, the operations can also include calculating static leakage current for the gate-level netlist using a normalized current for each of the different types of leakage current geometry data.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method of leakage current estimation for a circuit, comprising:
    generating a cell leakage library including cell-level leakage current geometry data for different states of cells of a cell library, wherein the cells are specified as transistor-level netlists;
    determining, using a processor, gate-level leakage current geometry data for gates of a gate-level netlist for the circuit based upon states of the gates for a selected operating state of the circuit and the cell-level leakage current geometry data; and
    determining, using the processor, total leakage current geometry data for the gate-level netlist by aggregating the gate-level leakage current geometry data, wherein the total leakage current geometry data is independent of process corner, voltage, and temperature.

2. The method of claim 1, further comprising:
    calculating static leakage current for the gate-level netlist using the total leakage current geometry data and normalized current.

3. The method of claim 2, wherein the normalized current is for a selected process corner, voltage, and temperature.

4. The method of claim 1, wherein the determining the gate-level leakage current geometry data comprises looking up leakage current geometry data from the cell leakage library for the gates of the gate-level netlist based upon the state of each gate in the gate-level netlist.

5. The method of claim 1, wherein the determining the total leakage current geometry data comprises summing the gate-level leakage current geometry data for the gates of the gate-level netlist.

6. The method of claim 1, wherein the total leakage current geometry data specifies a plurality of different types of leakage current geometry data.

7. The method of claim 6, wherein the different types of leakage current geometry data include at least one of a width corresponding to channel leakage, an area corresponding to tunneling leakage, or a width corresponding to bulk leakage.

8. The method of claim 7, further comprising:
calculating static leakage current for the gate-level netlist using a normalized current for each of the different types of leakage current geometry data.

9. A system for leakage current estimation for a circuit, comprising:
a memory configured to store instructions;
a processor coupled to the memory, wherein the processor, responsive to executing the instructions, is configured to initiate operations including:
generating a cell leakage library including cell-level leakage current geometry data for different states of cells of a cell library, wherein the cells are specified as transistor-level netlists;
determining gate-level leakage current geometry data for gates of a gate-level netlist for the circuit based upon states of the gates for a selected operating state of the circuit and the cell-level leakage current geometry data; and
determining total leakage current geometry data for the gate-level netlist by aggregating the gate-level leakage current geometry data, wherein the total leakage current geometry data is independent of process corner, voltage, and temperature.

10. The system of claim 9, wherein the processor, responsive to executing the instructions, is configured to initiate operations including:
calculating static leakage current for the gate-level netlist using the total leakage current geometry data and normalized current.

11. The system of claim 10, wherein the normalized current is for a selected process corner, voltage, and temperature.

12. The system of claim 9, wherein the determining the gate-level leakage current geometry data comprises looking up leakage current geometry data from the cell leakage library for the gates of the gate-level netlist based upon the state of each gate in the gate-level netlist.

13. The system of claim 9, wherein the determining the total leakage current geometry data comprises summing the gate-level leakage current geometry data for the gates of the gate-level netlist.

14. The system of claim 9, wherein the total leakage current geometry data specifies a plurality of different types of leakage current geometry data.

15. The system of claim 14, wherein the different types of leakage current geometry data include at least one of a width corresponding to channel leakage, an area corresponding to tunneling leakage, or a width corresponding to bulk leakage.

16. The system of claim 15, wherein the processor, responsive to executing the instructions, is configured to initiate operations including:
calculating static leakage current for the gate-level netlist using a normalized current for each of the different types of leakage current geometry data.

17. A computer program product comprising a computer readable storage medium having program code stored thereon for leakage current estimation for a circuit, the program code executable by a processor to perform operations comprising:
generating a cell leakage library including cell-level leakage current geometry data for different states of cells of a cell library, wherein the cells are specified as transistor-level netlists;
determining gate-level leakage current geometry data for gates of a gate-level netlist for the circuit based upon states of the gates for a selected operating state of the circuit and the cell-level leakage current geometry data; and
determining total leakage current geometry data for the gate-level netlist by aggregating the gate-level leakage current geometry data, wherein the total leakage current geometry data is independent of process corner, voltage, and temperature.

18. The computer program product of claim 17, wherein the program code is executable by the processor to perform operations further comprising:
calculating static leakage current for the gate-level netlist using the total leakage current geometry data and normalized current.

* * * * *